US010391849B2

(12) United States Patent
Suzuki et al.

(10) Patent No.: US 10,391,849 B2
(45) Date of Patent: Aug. 27, 2019

(54) VEHICLE DRIVE DEVICE

(71) Applicant: AISIN AW CO., LTD., Anjo-shi, Aichi-ken (JP)

(72) Inventors: Tomoyuki Suzuki, Anjo (JP); Tatsuyuki Uechi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 542 days.

(21) Appl. No.: 15/129,141

(22) PCT Filed: Apr. 24, 2015

(86) PCT No.: PCT/JP2015/062575
§ 371 (c)(1),
(2) Date: Sep. 26, 2016

(87) PCT Pub. No.: WO2015/163459
PCT Pub. Date: Oct. 29, 2015

(65) Prior Publication Data
US 2017/0100998 A1    Apr. 13, 2017

(30) Foreign Application Priority Data

Apr. 25, 2014    (JP) ................................ 2014-091337

(51) Int. Cl.
*B60K 6/405*    (2007.10)
*B60K 6/26*    (2007.10)
(Continued)

(52) U.S. Cl.
CPC .................. *B60K 6/26* (2013.01); *B60K 1/04* (2013.01); *B60K 6/24* (2013.01); *B60K 6/40* (2013.01);
(Continued)

(58) Field of Classification Search
CPC ... B60K 6/26; B60K 6/24; B60K 6/48; B60K 1/04; B60K 6/405; B60K 6/40;
(Continued)

(56) References Cited

U.S. PATENT DOCUMENTS 6,166,498 A * 12/2000 Yamaguchi ............. B60L 50/16
318/34
6,575,865 B2 * 6/2003 Takenaka ............... B60K 6/365
180/65.235
(Continued)

FOREIGN PATENT DOCUMENTS

EP    1947756 A1    7/2008
JP    2001-119961 A    4/2001
(Continued)

OTHER PUBLICATIONS

Jun. 23, 2015 International Search Report issued in Patent Application No. PCT/JP2015/062575.
(Continued)

*Primary Examiner* — Jacob B Meyer
(74) *Attorney, Agent, or Firm* — Oliff PLC

(57) ABSTRACT

A vehicle drive device that includes a rotating electrical machine that together with an internal combustion engine serves as a driving force source for wheels, a speed change device disposed next to the rotating electrical machine in an axial direction, or a direction in which a rotation axis of the rotating electrical machine extends, a drive device case formed by joining a first case accommodating the rotating electrical machine and a second case accommodating the speed change device, and a rotating electrical machine control device that controls the rotating electrical machine and that is fixed to outside of one of the first case and the second case.

20 Claims, 7 Drawing Sheets

(51) Int. Cl.
  *B60K 1/04*     (2019.01)
  *B60K 6/40*     (2007.10)
  *B60K 6/48*     (2007.10)
  *H02K 11/27*    (2016.01)
  *H02K 11/33*    (2016.01)
  *B60K 6/24*     (2007.10)
  *H02K 5/04*     (2006.01)
  *H02K 9/19*     (2006.01)
  *B60L 50/16*    (2019.01)

(52) U.S. Cl.
  CPC ............... *B60K 6/405* (2013.01); *B60K 6/48* (2013.01); *B60L 50/16* (2019.02); *H02K 5/04* (2013.01); *H02K 9/19* (2013.01); *H02K 11/27* (2016.01); *H02K 11/33* (2016.01); *B60K 2006/4825* (2013.01); *B60Y 2200/92* (2013.01); *B60Y 2400/112* (2013.01); *Y02T 10/6221* (2013.01); *Y02T 10/6252* (2013.01)

(58) Field of Classification Search
  CPC ... B60K 2006/4825; B60L 50/16; H02K 9/19; H02K 5/04; H02K 11/27; H02K 11/33; Y02T 10/6252; Y02T 10/6221; B60Y 2400/112; B60Y 2200/92
  See application file for complete search history.

(56) References Cited

U.S. PATENT DOCUMENTS

| | | | | |
|---|---|---|---|---|
| 7,786,640 | B2* | 8/2010 | Sada | B60K 6/365 310/112 |
| 7,847,450 | B2* | 12/2010 | Kakuda | B60K 6/405 310/89 |
| 7,855,887 | B2* | 12/2010 | Kakuda | B60K 6/365 165/104.33 |
| 8,102,138 | B2* | 1/2012 | Sekine | B62D 5/0406 180/443 |
| 8,181,731 | B2* | 5/2012 | Bessho | B60K 5/04 180/305 |
| 8,201,650 | B2 | 6/2012 | Yoshida | |
| 8,397,845 | B2* | 3/2013 | Yoshida | B60K 6/26 180/65.1 |
| 8,813,896 | B2* | 8/2014 | Littlefield | F16H 57/025 180/274 |
| 8,875,825 | B2* | 11/2014 | Asakura | B60K 6/405 180/68.4 |
| 9,018,807 | B2* | 4/2015 | Ito | H02M 7/003 310/64 |
| 9,065,322 | B2* | 6/2015 | Ito | H02K 5/225 |
| 9,295,186 | B2* | 3/2016 | Ivan | H05K 9/0007 |
| 9,358,870 | B2* | 6/2016 | Hotta | B60K 6/48 |
| 9,446,657 | B2* | 9/2016 | Takahashi | B60L 15/007 |
| 9,539,890 | B2* | 1/2017 | Miyazawa | B60K 6/26 |
| 9,802,470 | B2* | 10/2017 | Miyazawa | B60W 20/00 |
| 9,849,791 | B2* | 12/2017 | Suzuki | B60L 1/003 |
| 10,008,904 | B2* | 6/2018 | Kuramochi | B60K 6/36 |
| 10,122,247 | B2* | 11/2018 | Hattori | H05K 7/1432 |
| 10,259,310 | B2* | 4/2019 | Agata | B60K 6/405 |
| 2005/0167183 | A1* | 8/2005 | Tominaga | B62D 5/0406 180/444 |
| 2009/0206709 | A1* | 8/2009 | Kakuda | B60K 6/405 310/68 D |
| 2009/0243443 | A1* | 10/2009 | Aoki | H02K 11/048 310/68 D |
| 2009/0267352 | A1* | 10/2009 | Sada | B60K 6/365 290/1 A |
| 2009/0295325 | A1* | 12/2009 | Sekine | B62D 5/0406 318/646 |
| 2010/0072865 | A1* | 3/2010 | Endo | B60K 6/26 310/68 D |
| 2010/0284838 | A1* | 11/2010 | Ichise | F04B 35/04 417/410.1 |
| 2011/0118070 | A1 | 5/2011 | Purretat et al. | |
| 2012/0248909 | A1* | 10/2012 | Ito | H02M 7/003 310/64 |
| 2012/0250384 | A1* | 10/2012 | Ito | H02K 5/225 363/132 |
| 2012/0313465 | A1* | 12/2012 | Prix | H02K 5/20 310/54 |
| 2014/0084719 | A1* | 3/2014 | Asakura | B60K 6/405 310/54 |
| 2014/0202279 | A1* | 7/2014 | Triantos | F16H 39/00 74/606 R |
| 2014/0202402 | A1* | 7/2014 | Triantos | B60K 6/405 123/41.01 |
| 2015/0251531 | A1* | 9/2015 | Hotta | B60L 50/51 180/65.25 |
| 2016/0039276 | A1* | 2/2016 | Takahashi | B60L 15/007 180/65.21 |
| 2016/0052380 | A1* | 2/2016 | Miyazawa | B60K 6/26 180/65.21 |
| 2016/0072361 | A1* | 3/2016 | Kuramochi | B60K 6/36 310/68 D |
| 2017/0100998 | A1* | 4/2017 | Suzuki | B60K 1/04 |
| 2017/0158042 | A1* | 6/2017 | Miyazawa | B60W 20/00 |
| 2017/0232831 | A1* | 8/2017 | Agata | B60K 6/405 310/54 |

FOREIGN PATENT DOCUMENTS

| | | | |
|---|---|---|---|
| JP | 2007-118808 | A | 5/2007 |
| JP | 2010-001945 | A | 1/2010 |
| JP | 2012-065436 | A | 3/2012 |
| JP | 2012-101569 | A | 5/2012 |

OTHER PUBLICATIONS

May 4, 2017 Supplementary European Search Report issued in Patent Application No. 15782665.2.

\* cited by examiner

VEHICLE DRIVE DEVICE

BACKGROUND

The present disclosure relates to a vehicle drive device including a rotating electrical machine that together with an internal combustion engine serves as a driving force source for wheels, and a speed change device that is placed next to the rotating electrical machine.

Hybrid vehicles using different types of power, e.g., an internal combustion engine and a rotating electrical machine, as driving force sources for wheels have been used in practical applications. In such hybrid vehicles, a larger mounting space is required as compared to the case where, e.g., only an internal combustion engine is used as a driving force source. It is therefore important to efficiently mount components of the plurality of driving force sources to save space.

Japanese Patent Application Publication No. 2007-118808 discloses a vehicle drive device for hybrid vehicles. As shown in FIGS. 4, 8, 9 etc. of Japanese Patent Application Publication No. 2007-118808, a case (101) of this drive device (20) can be divided into two cases (102, 104). The two cases (102, 104) that can be separated from each other have flanges (105, 106) respectively, and these flanges (105, 106) are placed to contact each other and are fixed together by a bolt etc. to form the single case (101). One case (102) has an opening (108) as viewed in one direction along the contact surface between the flanges (as viewed from above in the perspective view of FIG. 3 of Japanese Patent Application Publication No. 2007-118808). A power control unit (power element substrate (120) etc.) is mounted inside the opening (108), and the opening (10) is covered by a cover (150).

As shown in FIG. 4 of Japanese Patent Application Publication No. 2007-118808, the power element substrate (120) is placed on one case (102) side of the contact surface between the flanges. In order to place the power element substrate (120) such that the power element substrate (120) does not protrude from the outer shape of the drive device (20) as viewed in one direction along the contact surface between the flanges (as the drive device (20) is viewed from a side), the size (width) of the power element substrate (120) needs to be within the length from the flange to an end of one case (102), namely the width of the case (102). For example, in the case where the power element substrate (120) is increased in size in order to improve performance of the rotating electrical machine, the power element substrate (120) protrudes from the outer shape of the drive device (20), which increases the lateral length of the drive device (20). A technique is therefore required in which each component is configured to sufficiently satisfy required performance and the components are efficiently arranged to configure a drive device in a space-saving manner, even in the case where such separately formed cases of the drive device are fixed together with their flanges being in contact with each other.

SUMMARY

In view of the above background, a technique is desired in which a drive device for hybrid vehicles which is formed by a plurality of components is configured in a space-saving manner.

In view of the above, a vehicle drive device according to one exemplary aspect includes a rotating electrical machine that together with an internal combustion engine serves as a driving force source for wheels, a speed change device disposed next to the rotating electrical machine in an axial direction, or a direction in which a rotation axis of the rotating electrical machine extends, a drive device case formed by joining a first case accommodating the rotating electrical machine and a second case accommodating the speed change device, the first case having a first open end, which is an end that opens to an axial first direction side, or one side in the axial direction, and a first flange formed around the first open end and extending outward in a radial direction perpendicular to the axial direction so as to have an increased diameter, the second case having a second open end, which is an end that opens to an axial second direction side, or the other side in the axial direction, and a second flange formed around the second open end and extending outward in the radial direction so as to have an increased diameter, and the first flange and the second flange being fastened together by a fastening member to form a joint flange, and a rotating electrical machine control device that controls the rotating electrical machine and that is fixed to outside of one of the first case and the second case, wherein the rotating electrical machine control device has a wide component and a narrow component having a smaller length in the axial direction than the wide component, the narrow component and the wide component are arranged so as to overlap each other as viewed in a specific radial direction, or a specific direction in the radial direction, and such that the narrow component is located inside in the radial direction of the wide component, the narrow component is disposed so as not to overlap the joint flange as viewed in the specific radial direction but to overlap the joint flange as viewed in the axial direction, and the wide component is disposed so as to overlap the joint flange as viewed in the specific radial direction but not to overlap the joint flange as viewed in the axial direction.

As used herein, the term "specific radial direction" refers to a specific direction that falls in a certain angle range in the radial direction that is rotatable through 360 degrees about the axial direction. For example, it is preferable that the specific radial direction be defined on the basis of the vertical direction in the state where the vehicle drive device is mounted on a vehicle, the lateral direction of the vehicle, the longitudinal direction of the vehicle, etc. The term "overlap" means that two members are seen such that at least a part of one member and at least a part of the other member overlap each other as viewed in a direction of a specified line of sight.

Of components of the rotating electrical machine control device, the wide component and the narrow component are disposed in the manner described above, whereby protrusion of the rotating electrical machine control device from an outer shape of the vehicle drive device in the axial direction can be reduced, and an overall size in the radial direction can be reduced. That is, since the wide component that is relatively long in the axial direction overlaps the joint flange as viewed in the specific radial direction, the joint flange and the wide component are not located next to each other in the axial direction, whereby the overall axial length of the vehicle drive device can be reduced. Moreover, since the narrow component having a relatively small axial length overlaps the joint flange as viewed in the axial direction, the joint flange and the narrow component are not located next to each other in the radial direction (specific radial direction), whereby the overall radial size of the vehicle drive device can be reduced. That is, according to this configuration, the drive device for hybrid vehicles which is formed by a plurality of components can be configured in a space-saving manner.

Further features and advantages of the vehicle drive device will be apparent from the following description of embodiments which is given with reference to the accompanying drawings.

DETAILED DESCRIPTION OF EMBODIMENTS

An embodiment of a vehicle drive device will be described with respect to a vehicle drive device (hybrid vehicle drive device) in a vehicle (hybrid vehicle) including both an internal combustion engine E and a rotating electrical machine MG as driving force sources for wheels W of the vehicle. The internal combustion engine E is an internal combustion engine that outputs power by explosive combustion of hydrocarbon fuel such as gasoline, light oil, ethanol, or natural gas, hydrogen, etc. The rotating electrical machine MG is a multi-phase alternating current (AC) (in this example, three-phase AC) rotating electrical machine and can function as either an electric motor or a generator. In the present embodiment, a drive device (vehicle drive device) 1 includes at least a rotating electrical machine MG that together with an internal combustion engine E serves as a driving force source for wheels W, and a speed change device TM. An output of the speed change device TM is transmitted to the wheels W via a counter gear (not shown) and a differential gear DF. As described below with reference to FIGS. 3 to 5 etc., the speed change device TM is placed next to the rotating electrical machine MG in the axial direction X, or the direction in which a rotation axis of the rotating electrical machine MG extends. In the following description, the axial direction X and the radial direction Y are defined on the basis of the rotation axis of the rotating electrical machine MG unless otherwise specified.

Figure 1:
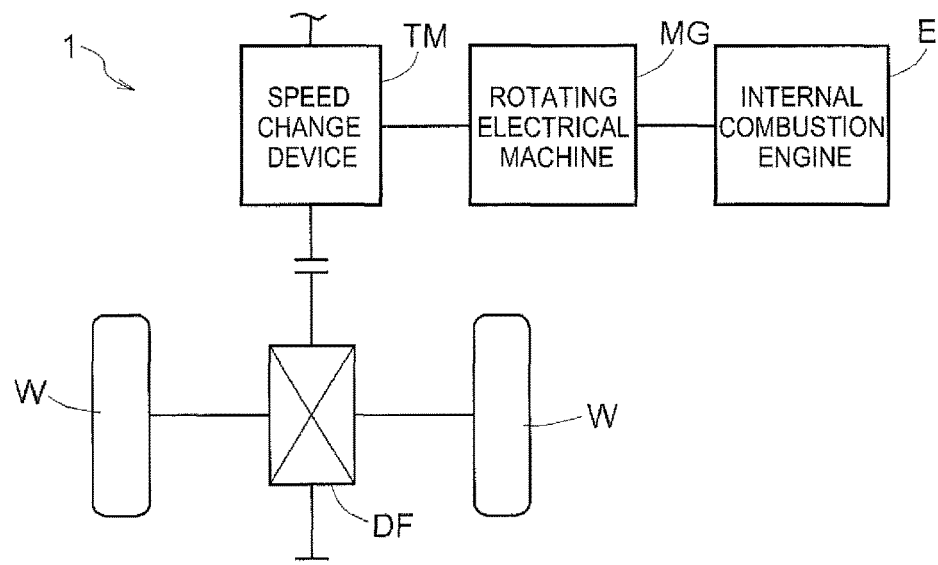
FIG. 1 is a block diagram schematically showing an example of the configuration of a vehicle drive device.
Figure 2:
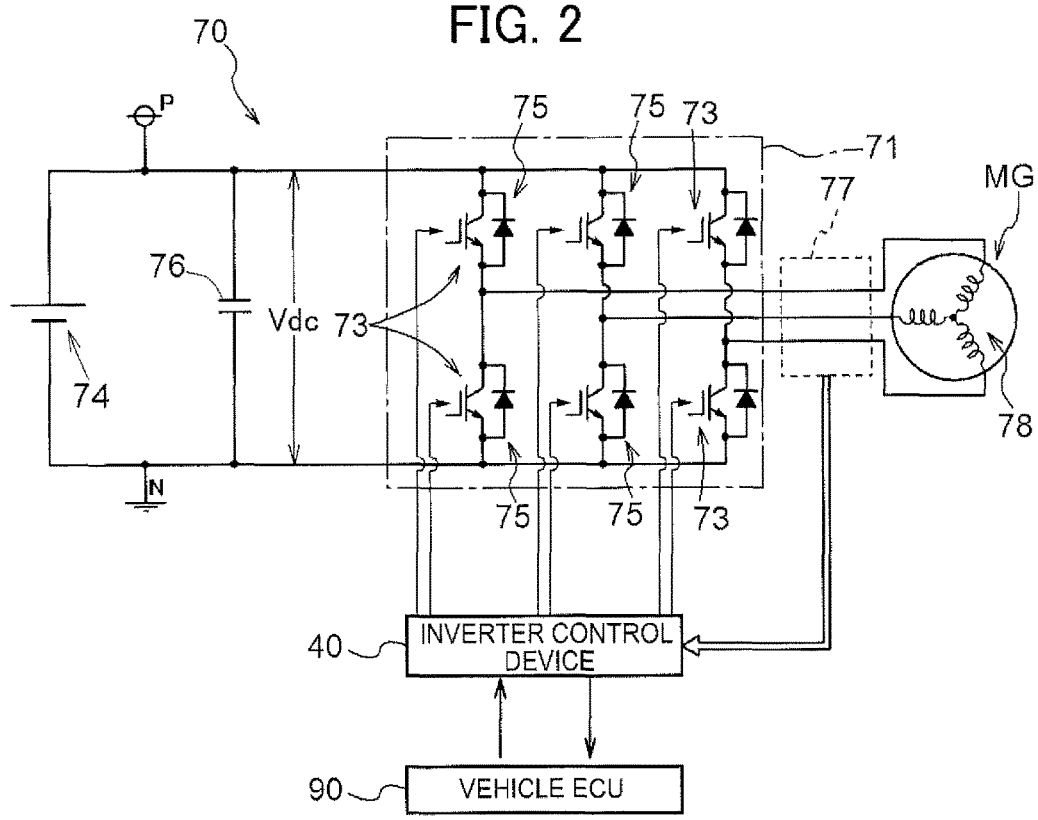
FIG. 2 is a block diagram schematically showing an example of the configuration of a rotating electrical machine control device.

FIG. 2 shows a rotating electrical machine control device 70 that drivingly controls the rotating electrical machine MG. The rotating electrical machine control device 70 includes an inverter 71 (power conversion device), and the inverter 71 converts electric power between direct current (DC) power supplied from a DC power supply 74 and alternating current (AC) power. For example, a power supply voltage of the DC power supply 74 is 200 to 400 [V]. The DC power supply 74 is a secondary battery such as a nickel-hydrogen battery or a lithium-ion battery, an electric double-layer capacitor, etc. The DC power supply 74 can supply electric power to the rotating electrical machine MG via the inverter 71 and can store electric power generated by the rotating electrical machine MG. A smoothing capacitor (DC link capacitor 76) that smooths a voltage (DC link voltage Vdc) between positive and negative electrodes on the DC side of the inverter 71 is disposed between the inverter 71 and the DC power supply 74. The DC link capacitor 76 stabilizes the DC voltage (DC link voltage Vdc) that fluctuates in accordance with fluctuations in power consumed by the rotating electrical machine MG.

The inverter 71 converts DC power having the DC link voltage Vdc to AC power of a plurality of phases (n phases, where n is a natural number, and in this example, three phases) and supplies the AC power to the rotating electrical machine MG. The inverter 71 also converts AC power generated by the rotating electrical machine MG to DC power and supplies the DC power to the DC power supply 74. The inverter 71 has a plurality of switching elements. It is preferable to use power semiconductor elements such as insulated gate bipolar transistors (IGBTs), power metal oxide semiconductor field effect transistors (MOSFETs), silicon carbide-metal oxide semiconductor FETs (SiC-MOSFETs), or SiC-static induction transistors (SiC-SITs) as the switching elements. As shown in FIG. 2, in the present embodiment, IGBTs 73 are used as the switching elements.

As well known in the art, the inverter 71 is formed by a bridge circuit having a number of arms respectively corresponding to the number of phases. Namely, as shown in FIG. 2, two IGBTs 73 are connected in series between the DC positive electrode (positive power line P on the positive electrode side of the DC power supply 74) and the DC negative electrode (negative power line N on the negative electrode side of the DC power supply 74) of the inverter 71 to form a single arm. In the case of the three-phase AC, three (three phases) of the series circuits (three of the arms) are connected in parallel. That is, the bridge circuit is formed in which the three series circuits (arms) respectively correspond to coils 78 corresponding to the U-phase, V-phase, and W-phase of the rotating electrical machine MG. A freewheeling diode (FWD) 75 is connected in parallel with each IGBT 73 such that the direction from the negative electrode "N" toward the positive electrode "P" (the direction from the lower part toward the upper part) is a forward direction. The present embodiment shows a form in which the inverter 71 with the three-phase arms having the IGBTs 73 and the FWDs 75 is provided as a module in a single package, namely as an intelligent power module (IPM) 22 (see FIG. 3).

As shown in FIG. 2, the inverter 71 is controlled by an inverter control device 40. The inverter control device 40 has a logic circuit such as a microcomputer as a core member. For example, the inverter control device 40 performs current feedback control using a vector control method to control the rotating electrical machine MG via the inverter 71, based on target torque of the rotating electrical machine MG which is received as a request signal from another control device etc. such as a vehicle ECU 90 via a controller area network (CAN). The inverter control device 40 has various functional units for the current feedback control, and each functional unit is implemented by cooperation between hardware such as the microcomputer and software (program). Since the current feedback control is known in the art, detailed description thereof will be omitted.

A current sensor 77 detects actual currents flowing in the coils 78 of each phase of the rotating electrical machine MG, and the inverter control device 40 obtains the detection result. The three-phase AC currents are in equilibrium, and the sum of their instantaneous values is always zero (the center of their amplitudes). Accordingly, only the currents of two of the three phases may be detected and the current of the remaining one phase may be obtained by calculation. For example, the positions of magnetic poles and the rotational speed of a rotor of the rotating electrical machine MG at each time are detected by a rotation sensor (not shown) such as a resolver or are detected by calculation using magnetic saliency of the rotor of the rotating electrical machine MG (sensorless detection of magnetic pole positions). For example, when the rotating electrical machine MG is rotating, an induced electromotive force contains information on the positions of the magnetic poles. Accordingly, the induced electromotive force is estimated from an output voltage of the inverter 71 and a feedback current, and the rotational speed and the positions of the magnetic poles are estimated. When the rotating electrical machine MG is stopped or is rotating at low speeds, no induced electromotive force is generated or a very small induced electromotive force is generated. Accordingly, a high-frequency observation signal (observation current or observation voltage) serving as an electrical stimulus is applied to the rotating electrical machine MG, and the rotational speed and the positions of the magnetic poles are estimated from the response of the rotating electrical machine MG.

Figure 3:
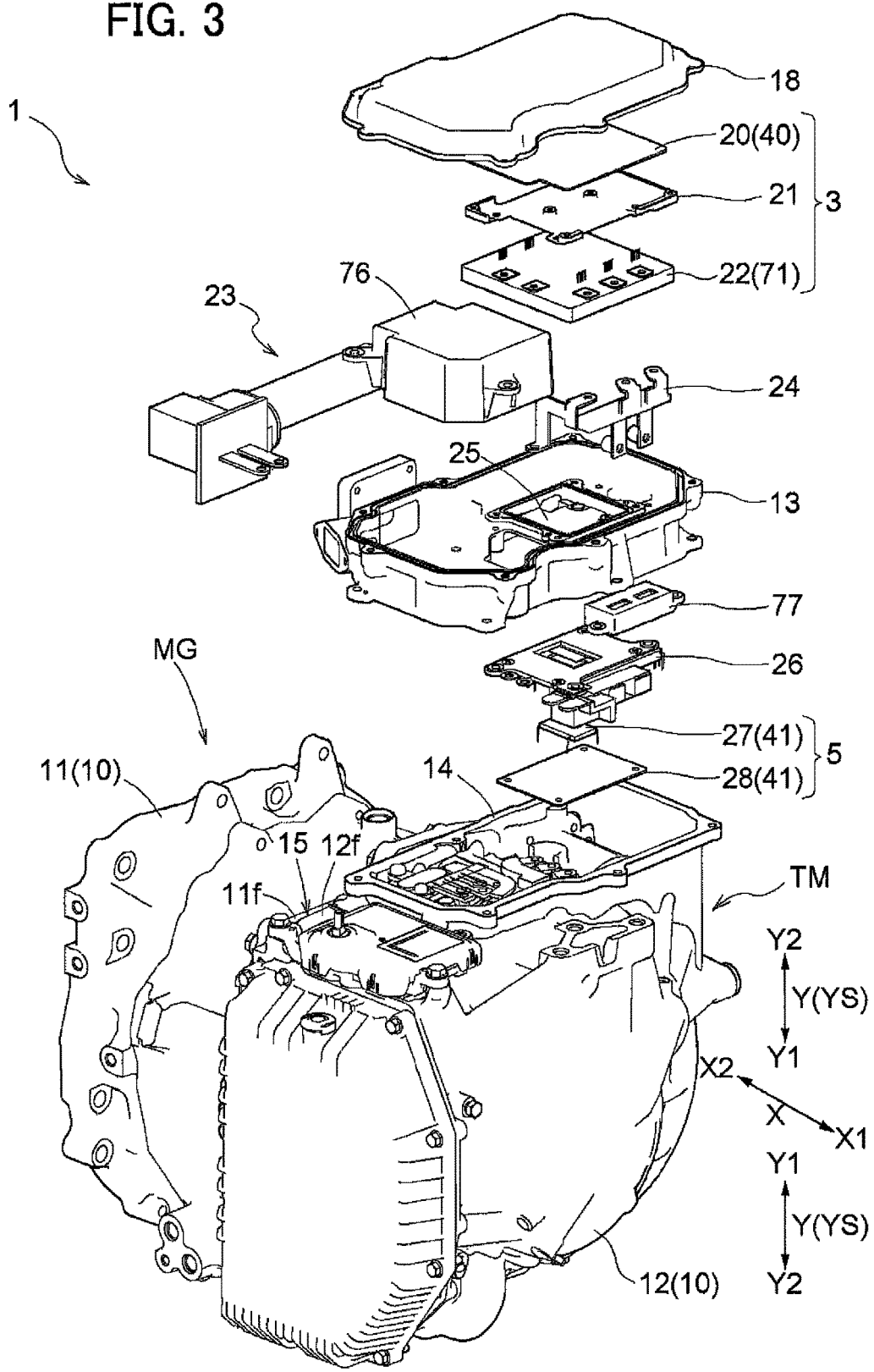
FIG. 3 is an exploded perspective view showing an example of the vehicle drive device.

In the present embodiment, the rotating electrical machine MG, the speed change device TM, and the rotating electrical machine control device 70 are integrated into the drive device 1. The configuration of the drive device 1 will be described below with reference to an exploded perspective view of the drive device 1 (FIG. 3), a top view of the drive device 1 (FIG. 4), a sectional view of the drive device 1 taken along line V-V in FIG. 4 (FIG. 5). As shown in FIG. 3 etc., the drive device 1 includes a drive device case 10 that is formed by joining a first case portion 11 (i.e., first case) accommodating the rotating electrical machine MG and a second case portion 12 (i.e., second case) accommodating the speed change device TM.

Figure 4:
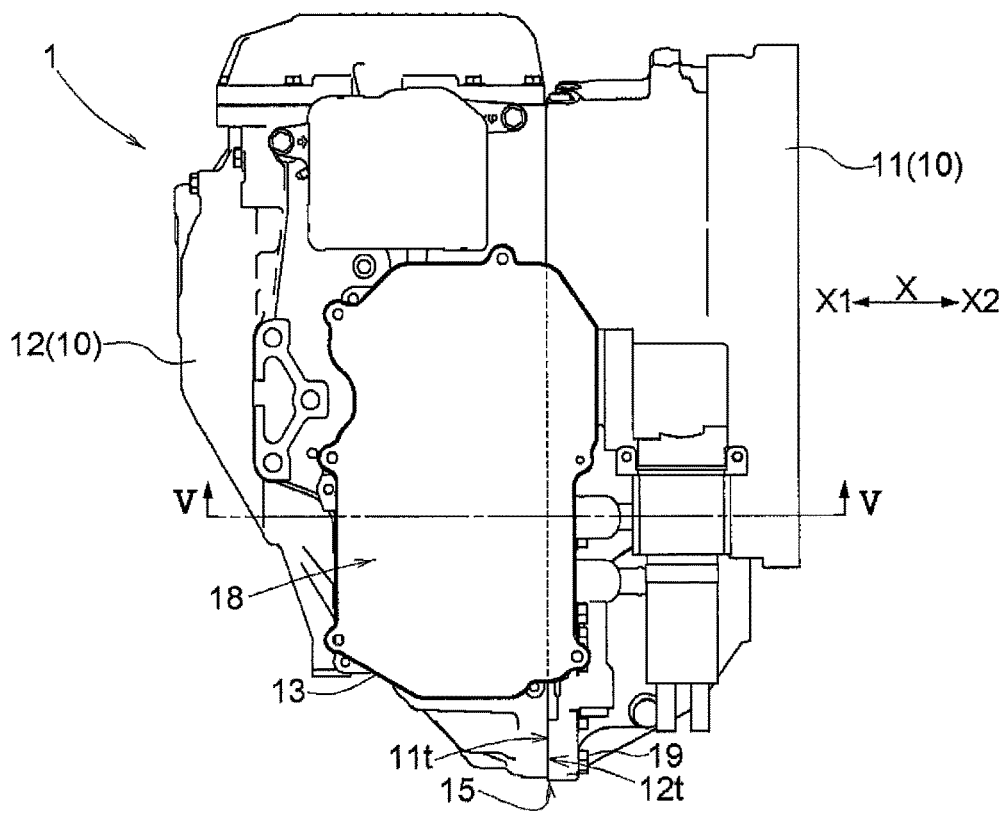
FIG. 4 is a top view showing an example of the vehicle drive device.
Figure 5:
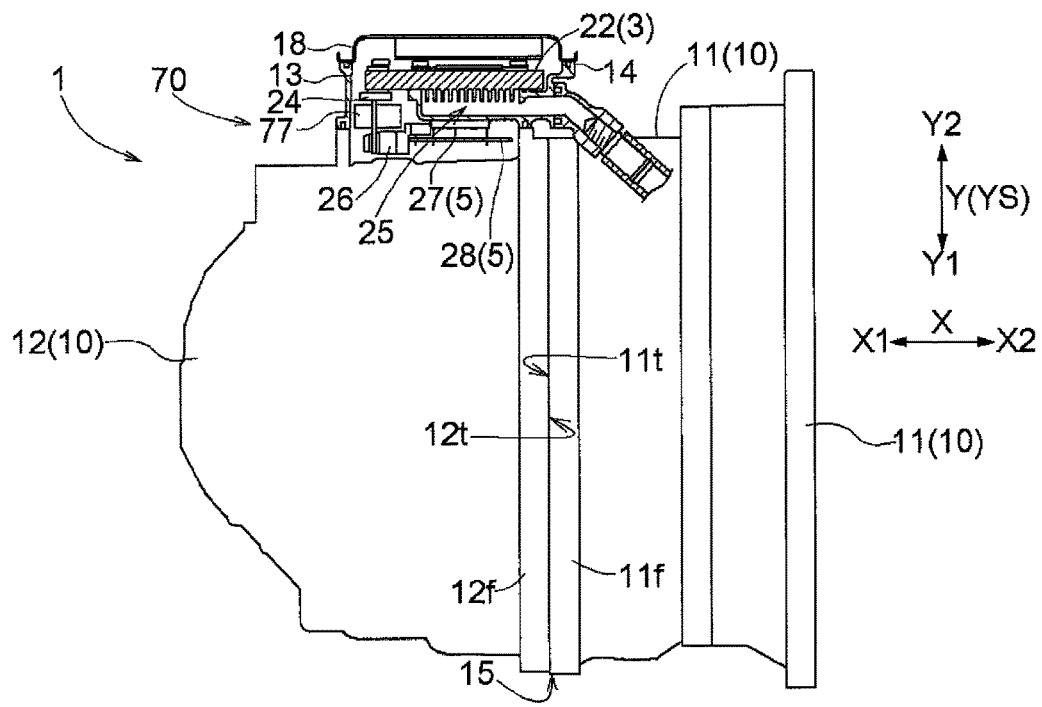
FIG. 5 is a sectional view taken along line V-V in FIG. 4.

As shown in FIGS. 4 and 5, the first case portion 11 has a first open end 11*t*, namely an end that opens to an axial first direction X1 side, or one side in the axial direction X. The first case portion 11 further has a first flange portion 11*f* (i.e., first flange) formed around the first open end 11*t* and extending outward in the radial direction Y perpendicular to the axial direction X (toward a radially outer side Y2) so as to have an increased diameter. The second case portion 12 has a second open end 12*t*, namely an end that opens to an axial second direction X2 side, or the other side in the axial direction X. The second case portion 12 further has a second flange portion 12*f* (i.e., second flange) formed around the second open end 12*t* and extending outward in the radial direction Y so as to have an increased diameter.

The first case portion 11 and the second case portion 12 form the drive device case 10 with the first flange portion 11*f* and the second flange portion 12*f* being placed in contact with each other and fixed together by a fastening member 19. The first flange portion 11*f* and the second flange portion 12*f* are fastened together by the fastening member 19 to form a joint flange portion 15 (i.e., joint flange) in the drive device case 10. The rotating electrical machine control device 70 is fixed to the outside of one (intended case portion) of the first case portion 11 and the second case portion 12. In the present embodiment, a control device case portion 13 (i.e., control device case) accommodating the rotating electrical machine control device 70 is mounted on the outside of the intended case portion, and a control device cover 18 is mounted on the control device case portion 13. That is, components of the drive device 1 are enclosed in the space formed by the first case portion 11, the second case portion 12, the control device case portion 13, and the control device cover 18.

As shown in FIG. 3 etc., in the present embodiment, the rotating electrical machine control device 70 has an inverter control substrate 20 having electronic components of the inverter control device 40 mounted thereon, a substrate bracket 21 that fixes the inverter control device 40, the IPM 22 (switching element module), a power supply module 23 including the DC link capacitor 76, an inverter bus bar module 24, the current sensor 77, an electric oil pump (EOP) bus bar module 26, an EOP driver chip 27, and an EOP control substrate 28. The control device case portion 13 accommodates these components and is fixed to the drive device case 10. As shown in FIG. 5, a cooling device 25 having a plurality of fins is formed in the control device case portion 13. In the present embodiment, the cooling device 25 is a water-cooling cooling device using cooling water etc. The cooling device 25 is disposed such that it can cool at least the IPM 22, and the IPM 22 and the cooling device 25 are placed so as to contact each other. The power supply module 23 includes power supply wiring connecting the DC power supply 74 (high voltage DC power supply) and the inverter 71, power supply wiring from a low voltage DC power supply, not shown, that supplies power of about 12 [V] to the inverter control device 40, etc.

The present embodiment shows a form in which an EOP control device 41 (electric pump control device) that controls a pump electric motor (not shown) serving as a driving force source for a hydraulic pump (not shown) is integrated into the drive device 1. The EOP bus bar module 26, the EOP driver chip 27, and the EOP control substrate 28 correspond to the EOP control device 41 (electric pump control device). A circuit including a switching element that drivingly controls the pump electric motor is integrated on the EOP driver chip 27.

As shown in FIGS. 3, 5, etc., components of the rotating electrical machine control device 70 include a wide component 3 having a relatively large length in the axial direction X and a narrow component 5 having a relatively small length in the axial direction X. That is, the wide component 3 is a component having a larger length in the axial direction X than the narrow component 5, and the narrow component 5 is a component having a smaller length in the axial direction X than the wide component 3. For example, as shown in FIG. 5, the IPM 22 is the wide component 3, and the EOP control device 41 formed by the EOP driver chip 27 and the EOP control substrate 28 is the narrow component 5.

As shown in FIGS. 3 to 5, the narrow component 5 (the EOP driver chip 27 and the EOP control substrate 28) and the wide component 3 (the IPM 22) are arranged such that the narrow component 5 is located inside in the radial direction Y of (on the radially inner side Y1 of) the wide component 3. The narrow component 5 (the EOP driver chip 27 and the EOP control substrate 28) and the wide component 3 (the IPM 22) are also arranged so as to overlap each other as viewed in a specific direction in the radial direction Y (the specific radial direction YS). As used herein, the "specific radial direction YS" refers to the vertical direction in FIGS. 3 and 5 and the direction perpendicular to the plane of paper in FIG. 4. The radial direction Y is rotatable through 360 degrees about the axial direction X. Accordingly, for example, the direction along the vertical direction in the state where the drive device 1 is mounted on the vehicle (the vertical direction in FIGS. 3 and 5 and the direction perpendicular to the plane of paper in FIG. 4) is herein defined as the specific radial direction YS.

The narrow component 5 (the EOP driver chip 27 and the EOP control substrate 28) is disposed so as not to overlap the joint flange portion 15 as viewed in the specific radial direction YS but to overlap the joint flange portion 15 as viewed in the axial direction X. The wide component 3 (the IPM 22) is disposed so as to overlap the joint flange portion 15 as viewed in the specific radial direction YS but not to overlap the joint flange portion 15 as viewed in the axial direction X.

Of the components of the rotating electrical machine control device 70, the wide component 3 (the IPM 22) and the narrow component 5 (the EOP driver chip 27 and the EOP control substrate 28) are disposed in this manner, whereby protrusion of the rotating electrical machine control device 70 from the outer shape of the drive device 1 in the axial direction X can be reduced, and the overall size in the radial direction Y can be reduced. That is, since the wide component 3 that is relatively long in the axial direction X overlaps the joint flange portion 15 as viewed in the specific radial direction YS, the joint flange portion 15 and the wide component 3 are not located next to each other in the axial direction X, whereby the overall axial length of the drive device 1 can be reduced. Moreover, since the narrow component 5 having a relatively small axial length overlaps the joint flange portion 15 as viewed in the axial direction X, the joint flange portion 15 and the narrow component 5 are not located next to each other in the radial direction Y (the specific radial direction YS), whereby the overall radial size of the drive device 1 can be reduced.

As described above, the rotating electrical machine control device 70 is accommodated in the control device case portion 13, and the control device case portion 13 is mounted on the outside of the intended case portion, namely one of the first case portion 11 and the second case portion 12. In the present embodiment, the control device case portion 13 is fixed to the outside of the second case portion 12 as the intended case portion. A mounting seat 14 on which the control device case portion 13 is mounted is therefore formed on the outside of the second case portion 12, or the intended case portion so as to protrude outward. As described above, the wide component 3 (e.g., the IPM 22) out of the components of the rotating electrical machine control device 70 overlaps the joint flange portion 15 as viewed in the specific radial direction YS. It is therefore preferable that the mounting seat 14 be formed in the joint flange portion 15. That is, it is preferable that a part of the mounting seat 14 be formed integrally with the radially outer side Y2 of an intended one of the first flange portion 11f and the second flange portion 12f, namely the flange portion of the intended case portion. The first flange portion 11f and the second flange portion 12f are fixed together to form the joint flange portion 15. Accordingly, the present disclosure does not preclude the configuration in which the intended flange portion is the flange portion of the case portion different from the intended case portion out of the first flange portion 11f and the second flange portion 12f and a part of the mounting seat 14 is formed integrally with the radially outer side Y2 of the intended flange portion.

In the case where the narrow component 5 has a sufficiently smaller length in the axial direction X than the wide component 3, there may be an empty space on the opposite side of the narrow component 5 from the joint flange portion 15 in the axial direction X and on the radially inner side Y1 of the wide component 3 in the specific radial direction YS. In the present embodiment, in FIG. 5, the current sensor 77 is disposed in the space located on the left side of the EOP driver chip 27 and below the IPM 22 in the figure. That is, the current sensor 77 that detects the currents flowing in the coils 78 (stator coils) of the rotating electrical machine MG is disposed on the opposite side of the narrow component 5 (the EOP driver chip 27) from the joint flange portion 15 so as to overlap the joint flange portion 15 as viewed in the axial direction X.

As shown in FIG. 5, the inverter bus bar module 24 is connected to the IPM 22 as the wide component 3 on the opposite side of the IPM 22 from the joint flange portion 15 in the axial direction X. The current sensor 77 detects currents flowing in bus bars connected to the coils 78 out of bus bars of the inverter bus bar module 24. It is therefore preferable that the current sensor 77 be placed on the opposite side from the joint flange portion 15 in the axial direction X where the inverter bus bar module 24 is placed. This arrangement can make good use of the space and can restrain an increase in size of the drive device 1.

The form of the drive device 1 is not limited to that described above with reference to FIGS. 3 to 5. A form different from that shown in FIGS. 3 to 5 will be described below with reference to an exploded perspective view of the drive device 1 (FIG. 6), a top view of the drive device 1 (FIG. 7), and a sectional view of the drive device 1 taken along line VIII-VIII in FIG. 7 (FIG. 8). The common members are denoted with the same reference characters as those of FIGS. 3 to 5. In this form as well, the drive device 1 includes a drive device case 10 formed by joining a first case portion 11 accommodating the rotating electrical machine MG and a second case portion 12 accommodating the speed change device TM.

Figure 7:
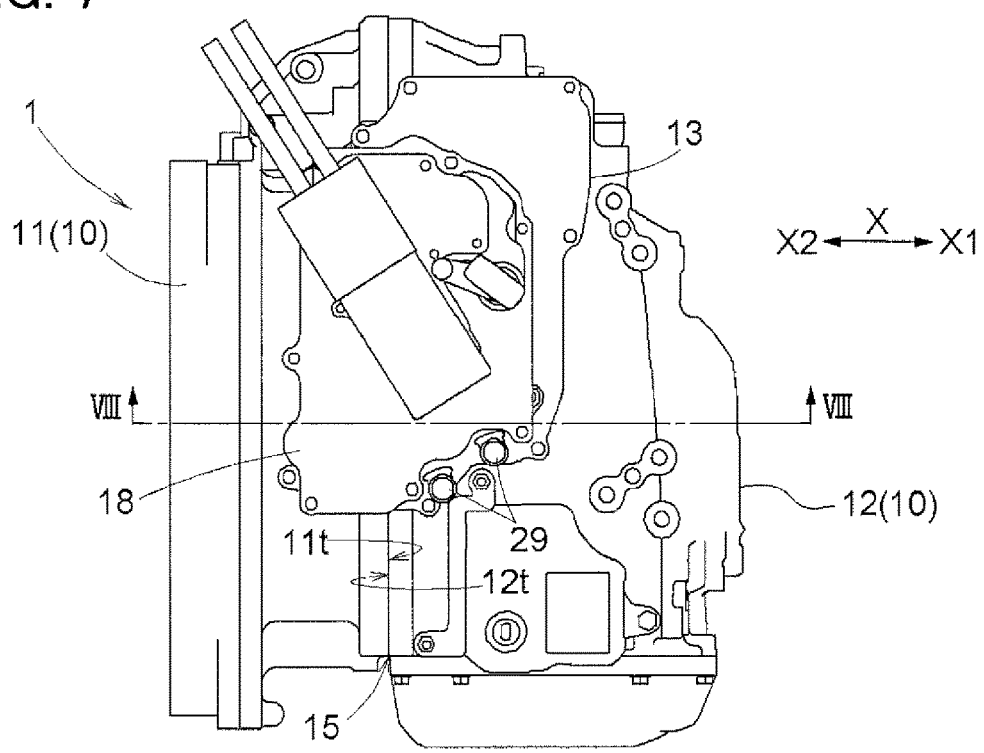
FIG. 7 is a top view showing another example of the vehicle drive device.
Figure 8:
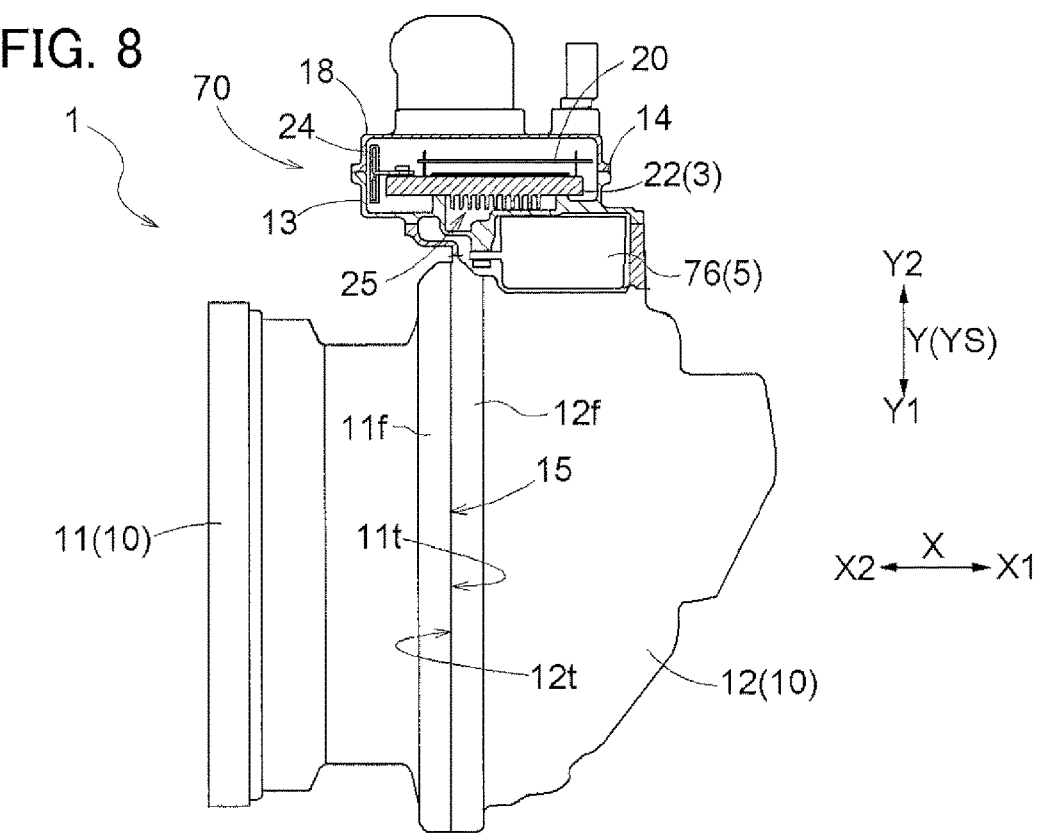
FIG. 8 is a sectional view taken along line VIII-VIII in FIG. 7.

In this form as well, as shown in FIGS. 7 and 8, the first case portion 11 has a first open end 11t, namely an end that opens to an axial first direction X1 side, or one side in the axial direction X. The first case portion 11 further has a first flange portion 11f formed around the first open end 11t and extending outward in the radial direction Y perpendicular to the axial direction X (toward a radially outer side Y2) so as to have an increased diameter. The second case portion 12 has a second open end 12t, namely an end that opens to an axial second direction X2 side, or the other side in the axial direction X. The second case portion 12 further has a second flange portion 12f formed around the second open end 12t and extending outward in the radial direction Y so as to have an increased diameter.

The first case portion 11 and the second case portion 12 form the drive device case 10 with the first flange portion 11f and the second flange portion 12f being placed in contact with each other and fixed together by a fastening member. The first flange portion 11f and the second flange portion 12f form a joint flange portion 15 in the drive device case 10. A rotating electrical machine control device 70 is fixed to the outside of one (intended case portion) of the first case portion 11 and the second case portion 12. In this form as well, a control device case portion 13 accommodating the rotating electrical machine control device 70 is mounted on the outside of the intended case portion, and a control device cover 18 is mounted on the control device case portion 13. That is, components of the drive device 1 are enclosed in the space formed by the first case portion 11, the second case portion 12, the control device case portion 13, and the control device cover 18.

Figure 6:
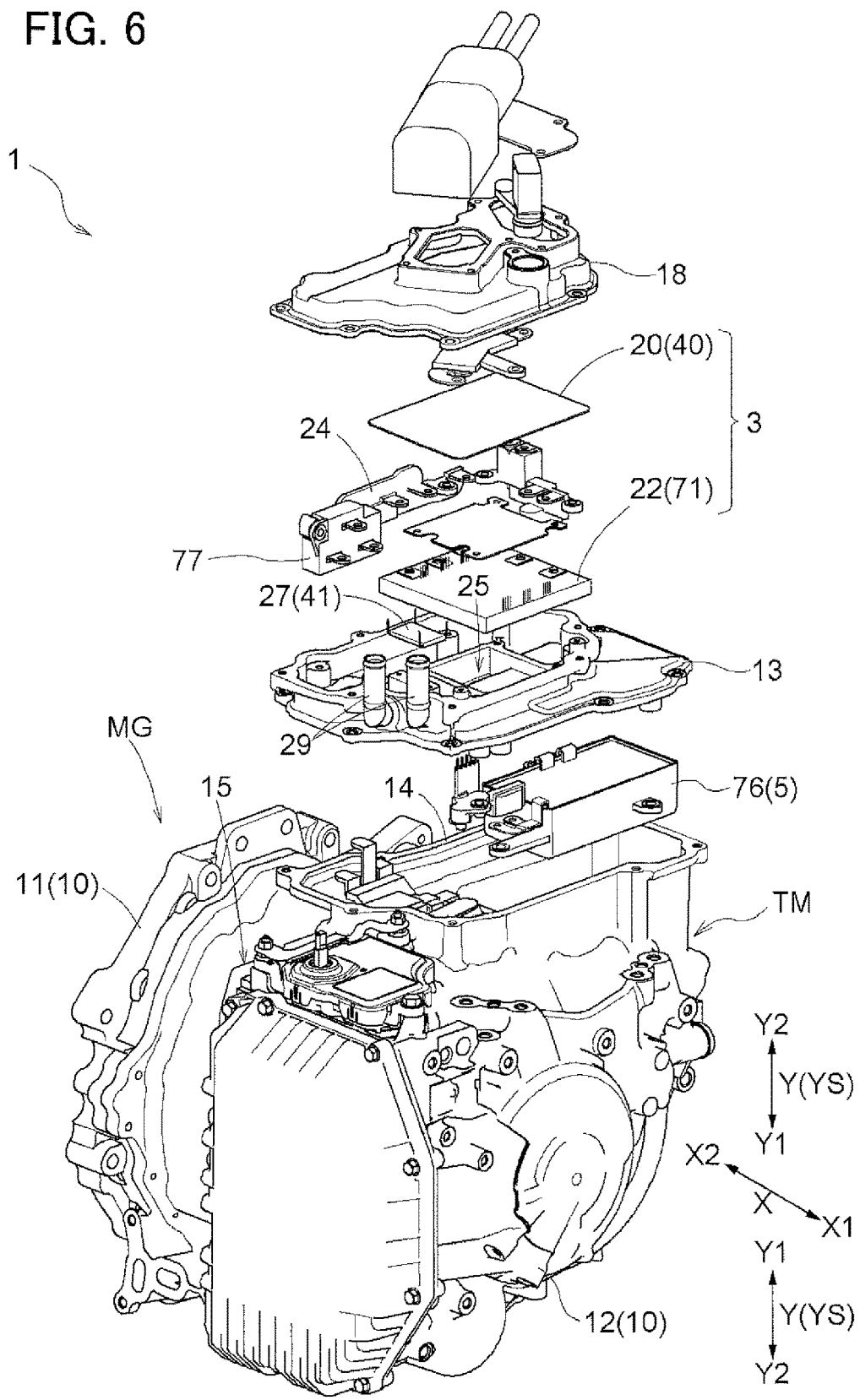
FIG. 6 is an exploded perspective view showing another example of the vehicle drive device.

As shown in FIG. 6 etc., in this form, the rotating electrical machine control device 70 has an inverter control substrate 20 having electronic components of an inverter control device 40 mounted thereon, an IPM 22 (switching element module), a DC link capacitor 76, an inverter bus bar module 24, a current sensor 77, and an electric oil pump (EOP) driver chip 27. In this form, an EOP control circuit (EOP control device 41) is included in the inverter control substrate 20. The control device case portion 13 accommodates these components and is fixed to the drive device case 10. In this form as well, as shown in FIG. 8, a cooling device 25 having a plurality of fins is formed in the control device case portion 13. The cooling device 25 is a water-cooling cooling device using cooling water etc. Reference numeral 29 in FIGS. 6 and 7 denotes inlet and outlet ports for a cooling medium. In this form as well, the cooling device 25 is disposed such that it can cool at least the IPM 22, and the IPM 22 and the cooling device 25 are placed so as to contact each other.

In this form as well, as shown in FIGS. 6, 8, etc., components of the rotating electrical machine control device 70 include a wide component 3 having a relatively large length in the axial direction X and a narrow component 5 having a relatively small length in the axial direction X. For example, as shown in FIG. 8, the IPM 22 is the wide component 3, and the DC link capacitor 76 is the narrow component 5.

As shown in FIGS. 6 to 8, the narrow component 5 (the DC link capacitor 76) and the wide component 3 (the IPM 22) are arranged such that the narrow component 5 is located inside in the radial direction Y of (on the radially inner side Y1 of) the wide component 3. The narrow component 5 (the DC link capacitor 76) and the wide component 3 (the IPM 22) are also arranged so as to overlap each other as viewed in a specific direction in the radial direction Y (the specific radial direction YS). As used herein, the "specific radial direction YS" refers to the vertical direction in FIGS. 6 and 8 and the direction perpendicular to the plane of paper in FIG. 7. The radial direction Y is rotatable through 360 degrees about the axial direction X. Accordingly, for example, the direction along the vertical direction in the state where the drive device 1 is mounted on the vehicle (the vertical direction in FIGS. 6 and 8 and the direction perpendicular to the plane of paper in FIG. 7) is herein defined as the specific radial direction YS.

The narrow component 5 (the DC link capacitor 76) is disposed so as not to overlap the joint flange portion 15 as viewed in the specific radial direction YS but to overlap the joint flange portion 15 as viewed in the axial direction X. The wide component 3 (the IPM 22) is disposed so as to overlap the joint flange portion 15 as viewed in the specific radial direction YS but not to overlap the joint flange portion 15 as viewed in the axial direction X.

In the form shown in FIGS. 6 to 8 as well, of the components of the rotating electrical machine control device 70, the wide component 3 (the IPM 22) and the narrow component 5 (the DC link capacitor 76) are disposed in this manner, whereby protrusion of the rotating electrical machine control device 70 from the outer shape of the drive device 1 in the axial direction X can be reduced, and the overall size in the radial direction Y can be reduced. That is, since the wide component 3 that is relatively long in the axial direction X overlaps the joint flange portion 15 as viewed in the specific radial direction YS, the joint flange portion 15 and the wide component 3 are not located next to each other in the axial direction X, whereby the overall axial length of the drive device 1 can be reduced. Moreover, since the narrow component 5 having a relatively small axial length overlaps the joint flange portion 15 as viewed in the axial direction X, the joint flange portion 15 and the narrow component 5 are not located next to each other in the radial direction Y (the specific radial direction YS), whereby the overall radial size of the drive device 1 can be reduced.

As described above, in both the form shown in FIGS. 3 to 5 and the form shown in FIGS. 6 to 8, the narrow component 5 and the wide component 3 are arranged in the drive device 1 in the following manner. The narrow component 5 and the wide component 3 are arranged so as to overlap each other as viewed in the specific radial direction YS, or the specific direction in the radial direction Y, and such that the narrow component 5 is located inside in the radial direction Y of (on the radially inner side Y1 of) the wide component 3. The narrow component 5 is disposed so as not to overlap the joint flange portion 15 as viewed in the specific radial direction YS but to overlap the joint flange portion 15 as viewed in the axial direction X. The wide component 3 is disposed so as to overlap the joint flange portion 15 as viewed in the specific radial direction YS but not to overlap the joint flange portion 15 as viewed in the axial direction X. In the form shown in FIGS. 3 to 5, the IPM 22 corresponds to the wide component 3, and the EOP control device 41 (the EOP driver chip 27 and the EOP control substrate 28) corresponds to the narrow component 5.

Figure 9:
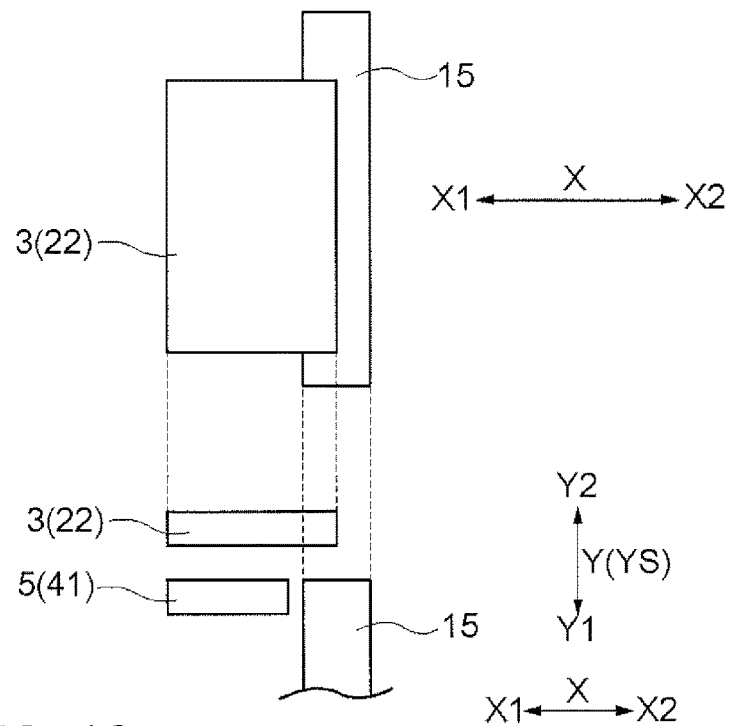
FIG. 9 is a conceptual diagram schematically showing an example of the positional relationship among a joint flange portion, a wide component, and a narrow component in the form shown in FIGS. 3 to 5.
Figure 10:
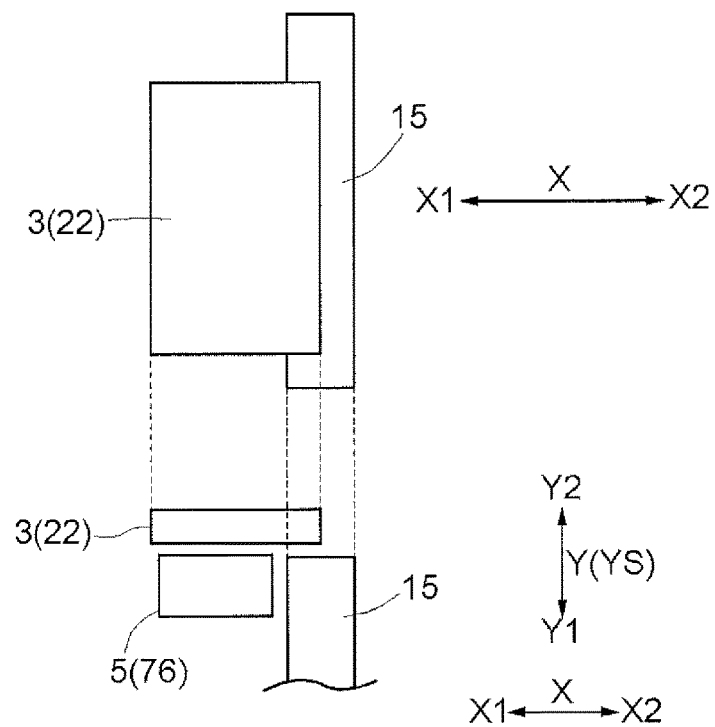
FIG. 10 is a conceptual diagram schematically showing an example of the positional relationship among a joint flange portion, a wide component, and a narrow component in the form shown in FIGS. 6 to 8.

FIG. 9 is a conceptual diagram schematically showing the relationship among the joint flange portion 15, the IPM 22, the EOP driver chip 27, and the EOP control device 41. The upper part in FIG. 9 shows a top view corresponding to FIG. 4, and the lower part in FIG. 9 shows a sectional view (side view) corresponding to FIG. 5. As shown in FIGS. 6 to 8, other components may correspond to the wide component 3 and the narrow component 5 as long as the relative positional relationship between the wide component 3 and the narrow component 5, the positional relationship between the joint flange portion 15 and the wide component 3, and the positional relationship between the joint flange portion 15 and the narrow component 5 satisfy the conditions described above. In the form shown in FIGS. 6 to 8, the IPM 22 (EOP control circuit (including the EOP control device 41) corresponds to the wide component 3, and the DC link capacitor 76 corresponds to the narrow component 5. FIG. 10 is a conceptual diagram schematically showing the relationship among the joint flange portion 15, the IPM 22, and the DC link capacitor 76 in this case in a manner similar to that of FIG. 9. FIG. 10 shows the state rotated by 180 degrees with respect to, e.g., FIG. 7 so as to correspond to FIG. 9.

Figure 11:
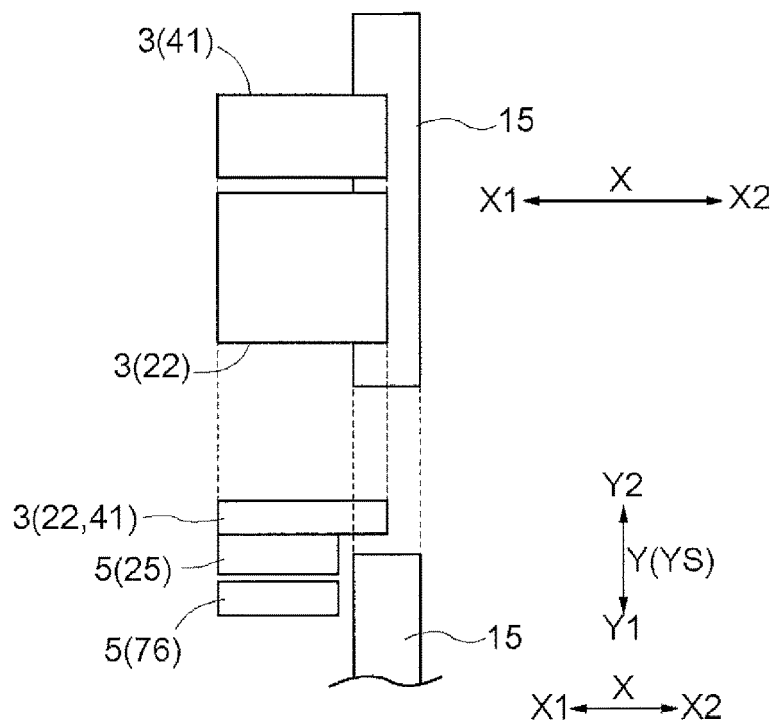
FIG. 11 is a conceptual diagram schematically showing another example of the positional relationship among a joint flange portion, a wide component, and a narrow component.
Figure 12:
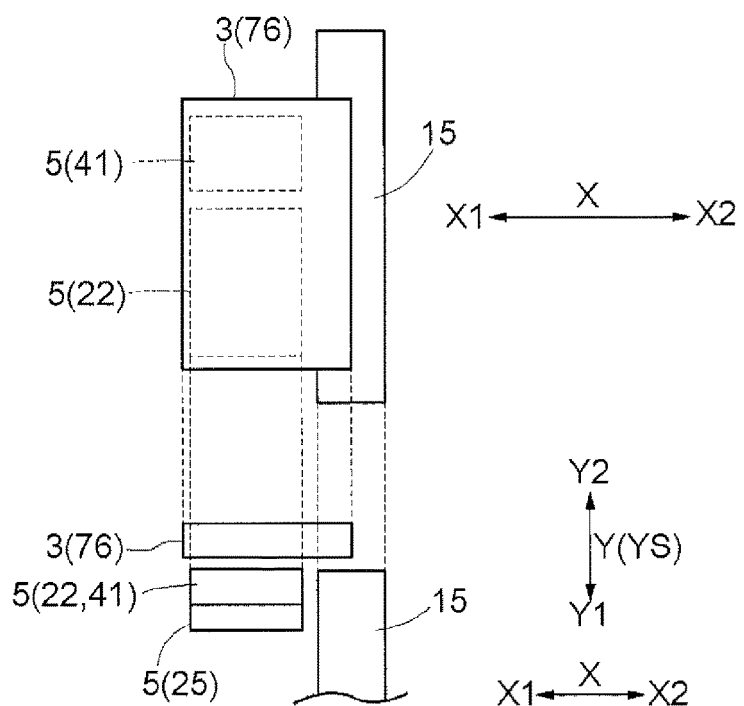
FIG. 12 is a conceptual diagram schematically showing still another example of the positional relationship among a joint flange portion, a wide component, and a narrow component.

It should be understood that even in a form whose specific configuration is not shown herein, other components may correspond to the wide component 3 and the narrow component 5 as long as the relative positional relationship between the wide component 3 and the narrow component 5, the positional relationship between the joint flange portion 15 and the wide component 3, and the positional relationship between the joint flange portion 15 and the narrow component 5 satisfy the conditions described above. FIGS. 11 and 12 show examples. In FIGS. 11 and 12 as well, the upper part shows a top view and the lower part shows a sectional view (side view).

In FIG. 11, the wide component 3 is the IPM 22 and the EOP control device 41 (electric pump control device). The narrow component 5 is the cooling device 25 and the DC link capacitor 76. The EOP control device 41, which is the narrow component 5 in the form shown in FIGS. 3 to 5 and FIG. 9, is disposed next to the IPM 22, and the EOP control device 41 and the IPM 22 form the wide component 3. The cooling device 25 can cool the IPM 22 even if it does not contact the entire surface of the IPM 22. Accordingly, the cooling device 25 is configured as the narrow component 5 having a smaller length in the axial direction X than the IPM 22 as the wide component 3. The cooling device 25 is disposed such that the main part of the IPM 22 (the part in which switching elements are present and which generates a large amount of heat) contacts the cooling device 25.

In FIG. 12, the wide component 3 is the DC link capacitor 76, and the narrow component 5 is the IPM 22, the EOP control device 41 (electric pump control device), and the cooling device 25. As in the form shown in FIG. 11, the EOP control device 41 is disposed next to the IPM 22, and in this example, the EOP control device 41 and the IPM 22 form the narrow component 5. The cooling device 25 is disposed so as to contact the IPM 22. Alternatively, the cooling device 25 may be disposed so as to contact the IPM 22 and the EOP control device 41.

As described above, according to the present embodiment, the drive device 1 for hybrid vehicles which is formed by a plurality of components can be configured in a space-saving manner.

Other Embodiments

Other embodiments of the vehicle drive device will be described below. The configuration of each embodiment described below may not only be used by itself, but also be combined with any of the configurations of the other embodiments unless inconsistency arises.

(1) In the above description, the form is shown in which the switching elements of the inverter 71 are provided as a module, namely the IPM 22. However, the inverter 71 may be configured by mounting individual components such as IGBTs on a wiring board.

(2) In the above description, the form is shown in which the electric pump control device (EOP control device 41) is incorporated in the drive device 1. However, the control device that drivingly controls the rotating electrical machine MG (rotating electrical machine control device 70) may be incorporated in the drive device 1.

Summary of Embodiments of Vehicle Drive Device

The vehicle drive device (1) according to the embodiment described above includes at least the following configurations:

a rotating electrical machine (MG) that together with an internal combustion engine (E) serves as a driving force source for wheels (W), a speed change device (TM) disposed next to the rotating electrical machine (MG) in an axial direction (X), or a direction in which a rotation axis of the rotating electrical machine (MG) extends, and a drive device case (10) formed by joining a first case portion (11) accommodating the rotating electrical machine (MG) and a second case portion (12) accommodating the speed change device (TM), the first case portion (11) having a first open end (11t), which is an end that opens to an axial first direction (X1) side, or one side in the axial direction (X), and a first flange portion (11f) formed around the first open end (11t) and extending outward (Y2) in a radial direction (Y) perpendicular to the axial direction (X) so as to have an increased diameter, the second case portion (12) having a second open end (12t), which is an end that opens to an axial second direction (X2) side, or the other side in the axial direction (X), and a second flange portion (12f) formed around the second open end (12l) and extending outward in the radial direction (Y) so as to have an increased diameter, and the first flange portion (11f) and the second flange portion (12f) being fastened together by a fastening member (19) to form a joint flange portion (15).

The vehicle drive device (1) further includes: a rotating electrical machine control device (70) that controls the rotating electrical machine (MG) and that is fixed to outside of one of the first case portion (11) and the second case portion (12).

The rotating electrical machine control device (70) has a wide component (3) and a narrow component (5) having a smaller length in the axial direction (X) than the wide component (3).

The narrow component (5) and the wide component (3) are arranged so as to overlap each other as viewed in a specific radial direction (YS), or a specific direction in the radial direction (Y), and such that the narrow component (5) is located inside (Y1) in the radial direction (Y) of the wide component (3).

The narrow component (5) is disposed so as not to overlap the joint flange portion (15) as viewed in the specific radial direction (YS) but to overlap the joint flange portion (15) as viewed in the axial direction (X).

The wide component (3) is disposed so as to overlap the joint flange portion (15) as viewed in the specific radial direction (YS) but not to overlap the joint flange portion (15) as viewed in the axial direction (X).

Of components of the rotating electrical machine control device (70), the wide component (3) and the narrow component (5) are disposed in this manner, whereby protrusion of the rotating electrical machine control device (70) from an outer shape of the vehicle drive device (1) in the axial direction (X) can be reduced, and the size in the radial direction (Y) can be reduced. That is, since the wide component (3) that is relatively long in the axial direction (X) overlaps the joint flange portion (15) as viewed in the specific radial direction (YS), the joint flange portion (15) and the wide component (3) are not located next to each other in the axial direction (X), whereby the overall axial length of the vehicle drive device (1) can be reduced. Moreover, since the narrow component (5) having a relatively small axial length overlaps the joint flange portion (15) as viewed in the axial direction (X), the joint flange portion (15) and the narrow component (5) are not located next to each other in the radial direction (Y) (specific radial direction (YS)), whereby the overall radial size of the vehicle drive device (1) can be reduced.

It is preferable that the wide component (3) include a switching element module (22), the narrow component (5) include a cooling device (25) that cools at least the switching element module (22), and the switching element module (22) and the cooling device (25) be arranged so as to contact each other. Since the switching element module (22) and the cooling device (25) are arranged so as to contact each other, the switching element module (22) can be effectively cooled.

Based on the fact that the cooling device (25) disposed so as to contact the switching element module (22) has a smaller axial length than the switching element module (22), the switching element module (22) and the cooling device (25) can be appropriately arranged in the radial direction (Y) near an end of the coupling flange portion (15) to reduce the size in the axial direction (X) and the radial direction (Y) of the vehicle drive device (1).

If a control device that controls another device is also mounted on the rotating electrical machine control device (70), the overall mounting efficiency of a vehicle can be improved. Since such a control device is often smaller than the control device for the rotating electrical machine (MG) that drives the wheels (W), it is preferable that such a control device be the narrow component (5) and disposed on a radially inner side (X1). In one aspect, it is preferable that the narrow component (5) include an electric pump control device (41) that controls a pump electric motor serving as a driving force source for a hydraulic pump.

A capacitor that reduces fluctuations in power supply voltage tends to have a larger size as its voltage resistance increases. Accordingly, if the capacitor is mounted on an outer edge portion of the vehicle drive device (1) etc., the outer shape of the vehicle drive device (1) may be increased. On the other hand, if the capacitor can be appropriately disposed in the vehicle drive device (1), the size of the vehicle drive device (1) can be reduced. For example, it is preferable that such a capacitor be the narrow component (5) and disposed on the radially inner side (X1). In one aspect, it is preferable that the narrow component (5) include a smoothing capacitor (76) that smooths a DC link voltage (Vdc), or a voltage between positive and negative electrodes on a DC power supply side of a power conversion device (71) connected between the DC power supply and the rotating electrical machine (MG).

As described above, the rotating electrical machine control device (70) is fixed to the outside of at least one of the first case portion (11) and the second case portion (12). It is preferable that the rotating electrical machine control device (70) be accommodated in a control device case portion (13), the control device case portion (13) be mounted on the outside of an intended case portion, or one of the first case portion (11) and the second case portion (12), a mounting seat (14) on which the control device case portion (13) is mounted be formed on the outside of the intended case portion so as to protrude outward, and a part of the mounting seat (14) be formed integrally with a radially outer side (Y2) of an intended one of the first flange portion (11f) and the second flange portion (12f), or a flange portion of the intended case portion.

Defining the positional relationship of the wide component (3) and the narrow component (5) with the joint flange portion (15) as described above allows the components of the vehicle drive device (1) to be arranged efficiently and can restrain an increase in size of the vehicle drive device (1). Forming the mounting seat (14) for the control device case portion (13) integrally with one of the first flange portion (11f) and the second flange portion (12f) of the joint flange portion (15) can implement the above positional relationship of the wide component (3) and the narrow component (5) with the joint flange portion (15).

In the case where the narrow component (5) has a sufficiently smaller length in the axial direction (X) than the wide component (3), there may be an empty space on the opposite side of the narrow component (5) from the joint flange portion (15) in the axial direction (X) and on the radially inner side (Y1) of the wide component (3) in the specific radial direction (YS). Placing a component of the rotating electrical machine control device (70) in this empty space can make good use of the space and can restrain an increase in size of the vehicle drive device (1). In one aspect, it is preferable that a current sensor (77) that detects a current flowing in a coil (78) of the rotating electrical machine (MG) be disposed on the opposite side of the narrow component (5) from the joint flange portion (15) so as to overlap the joint flange portion (15) as viewed in the axial direction (X).

INDUSTRIAL APPLICABILITY

The present disclosure is applicable to vehicle drive devices including a rotating electrical machine that together with an internal combustion engine serves as a driving force source for wheels and a speed change device that is placed next to the rotating electrical machine.

The invention claimed is:
1. A vehicle drive device comprising:
a rotating electrical machine that together with an internal combustion engine serves as a driving force source for wheels,
a speed change device disposed next to the rotating electrical machine in an axial direction, or a direction in which a rotation axis of the rotating electrical machine extends,
a drive device case formed by joining a first case accommodating the rotating electrical machine and a second case accommodating the speed change device,
the first case having a first open end, which is an end that opens to an axial first direction side, or one side in the axial direction, and a first flange formed around the first open end and extending outward in a radial direction perpendicular to the axial direction so as to have an increased diameter,
the second case having a second open end, which is an end that opens to an axial second direction side, or the other side in the axial direction, and a second flange formed around the second open end and extending outward in the radial direction so as to have an increased diameter, and
the first flange and the second flange being fastened together by a fastening member to form a joint flange, and
a rotating electrical machine control device that controls the rotating electrical machine and that is fixed to outside of one of the first case and the second case, wherein
the rotating electrical machine control device has a wide component and a narrow component having a smaller length in the axial direction than the wide component,
the narrow component and the wide component are arranged so as to overlap each other as viewed in a specific radial direction, or a specific direction in the radial direction, and such that the narrow component is located inside in the radial direction of the wide component,
the narrow component is disposed so as not to overlap the joint flange as viewed in the specific radial direction but to overlap the joint flange as viewed in the axial direction, and
the wide component is disposed so as to overlap the joint flange as viewed in the specific radial direction but not to overlap the joint flange as viewed in the axial direction.

2. The vehicle drive device according to claim 1, wherein
the wide component includes a switching element module, the narrow component includes a cooling device that cools at least the switching element module, and the switching element module and the cooling device are arranged so as to contact each other.

3. The vehicle drive device according to claim 2, wherein
the narrow component includes an electric pump control device that controls a pump electric motor serving as a driving force source for a hydraulic pump.

4. The vehicle drive device according to claim 3, wherein
the rotating electrical machine control device is accommodated in a control device case,
the control device case is mounted on the outside of an intended case, or one of the first case and the second case,
a mounting seat on which the control device case is mounted is formed on the outside of the intended case so as to protrude outward, and
a part of the mounting seat is formed integrally with a radially outer side of an intended one of the first flange and the second flange, or a flange of the intended case.

5. The vehicle drive device according to claim 4, wherein
a current sensor that detects a current flowing in a coil of the rotating electrical machine is disposed on an opposite side of the narrow component from the joint flange so as to overlap the joint flange as viewed in the axial direction.

6. The vehicle drive device according to claim 1, wherein
the narrow component includes an electric pump control device that controls a pump electric motor serving as a driving force source for a hydraulic pump.

7. The vehicle drive device according to claim 1, wherein
the narrow component includes a smoothing capacitor that smooths a DC link voltage, or a voltage between positive and negative electrodes on a DC power supply side of a power conversion device connected between the DC power supply and the rotating electrical machine.

8. The vehicle drive device according to claim 1, wherein
the rotating electrical machine control device is accommodated in a control device case,
the control device case is mounted on the outside of an intended case, or one of the first case and the second case,
a mounting seat on which the control device case is mounted is formed on the outside of the intended case so as to protrude outward, and
a part of the mounting seat is formed integrally with a radially outer side of an intended one of the first flange and the second flange, or a flange of the intended case.

9. The vehicle drive device according to claim 1, wherein
a current sensor that detects a current flowing in a coil of the rotating electrical machine is disposed on an opposite side of the narrow component from the joint flange so as to overlap the joint flange as viewed in the axial direction.

10. The vehicle drive device according to claim 2, wherein
the narrow component includes a smoothing capacitor that smooths a DC link voltage, or a voltage between positive and negative electrodes on a DC power supply side of a power conversion device connected between the DC power supply and the rotating electrical machine.

11. The vehicle drive device according to claim 2, wherein
the rotating electrical machine control device is accommodated in a control device case,
the control device case is mounted on the outside of an intended case, or one of the first case and the second case,
a mounting seat on which the control device case is mounted is formed on the outside of the intended case so as to protrude outward, and
a part of the mounting seat is formed integrally with a radially outer side of an intended one of the first flange and the second flange, or a flange of the intended case.

12. The vehicle drive device according to claim 2, wherein
a current sensor that detects a current flowing in a coil of the rotating electrical machine is disposed on an opposite side of the narrow component from the joint flange so as to overlap the joint flange as viewed in the axial direction.

13. The vehicle drive device according to claim 6, wherein
the rotating electrical machine control device is accommodated in a control device case,
the control device case is mounted on the outside of an intended case, or one of the first case and the second case,
a mounting seat on which the control device case is mounted is formed on the outside of the intended case so as to protrude outward, and
a part of the mounting seat is formed integrally with a radially outer side of an intended one of the first flange and the second flange, or a flange of the intended case.

14. The vehicle drive device according to claim 6, wherein
a current sensor that detects a current flowing in a coil of the rotating electrical machine is disposed on an opposite side of the narrow component from the joint flange so as to overlap the joint flange as viewed in the axial direction.

15. The vehicle drive device according to claim 7, wherein
the rotating electrical machine control device is accommodated in a control device case,
the control device case is mounted on the outside of an intended case, or one of the first case and the second case,
a mounting seat on which the control device case is mounted is formed on the outside of the intended case so as to protrude outward, and
a part of the mounting seat is formed integrally with a radially outer side of an intended one of the first flange and the second flange, or a flange of the intended case.

16. The vehicle drive device according to claim 7, wherein
a current sensor that detects a current flowing in a coil of the rotating electrical machine is disposed on an opposite side of the narrow component from the joint flange so as to overlap the joint flange as viewed in the axial direction.

17. The vehicle drive device according to claim 8, wherein
a current sensor that detects a current flowing in a coil of the rotating electrical machine is disposed on an opposite side of the narrow component from the joint flange so as to overlap the joint flange as viewed in the axial direction.

18. The vehicle drive device according to claim 10, wherein
- the rotating electrical machine control device is accommodated in a control device case,
- the control device case is mounted on the outside of an intended case, or one of the first case and the second case,
- a mounting seat on which the control device case is mounted is formed on the outside of the intended case so as to protrude outward, and
- a part of the mounting seat is formed integrally with a radially outer side of an intended one of the first flange and the second flange, or a flange of the intended case.

19. The vehicle drive device according to claim 18, wherein
- a current sensor that detects a current flowing in a coil of the rotating electrical machine is disposed on an opposite side of the narrow component from the joint flange so as to overlap the joint flange as viewed in the axial direction.

20. The vehicle drive device according to claim 10, wherein
- a current sensor that detects a current flowing in a coil of the rotating electrical machine is disposed on an opposite side of the narrow component from the joint flange so as to overlap the joint flange as viewed in the axial direction.

* * * * *